United States Patent [19]

Ina et al.

[11] Patent Number: 4,517,648
[45] Date of Patent: May 14, 1985

[54] TORQUE VARIATION DETECTING METHOD AND APPARATUS FOR INTERNAL COMBUSTION ENGINE

[75] Inventors: Toshikazu Ina, Aichi; Hisasi Kawai, Toyohashi; Tokio Kohama, Nishio; Hideki Obayashi, Okazaki; Daisaku Sawada; Takashi Shigematsu, both of Susono, all of Japan

[73] Assignee: Nippon Soken, Inc., Nishio, Japan

[21] Appl. No.: 399,955

[22] Filed: Jul. 19, 1982

[30] Foreign Application Priority Data

Jul. 20, 1981 [JP] Japan .................................. 56-113142

[51] Int. Cl.³ .................... G01L 23/32; G01M 15/00; G01P 15/11
[52] U.S. Cl. ................. 364/431.01; 73/117.4; 364/508; 364/551
[58] Field of Search ........... 364/508, 550, 551, 431.08, 364/431.01; 73/35 R, 117.4

[56] References Cited

U.S. PATENT DOCUMENTS

| | | |
|---|---|---|
| 4,271,469 | 6/1982 | Kawai et al. ........................ 73/35 X |
| 4,354,378 | 10/1982 | Oshiage et al. ...................... 73/35 |
| 4,356,551 | 10/1982 | Iwase et al. ...................... 73/35 X |
| 4,366,544 | 12/1982 | Shima et al. .................... 364/508 X |
| 4,388,902 | 6/1983 | Latapie ............................... 73/35 X |
| 4,425,891 | 1/1984 | Kashimura et al. ................ 73/35 X |
| 4,428,344 | 1/1984 | Focht .................................. 73/35 X |
| 4,429,565 | 2/1984 | Utsumi et al. ........................ 73/35 |

*Primary Examiner*—Felix D. Gruber
*Attorney, Agent, or Firm*—Cushman, Darby & Cushman

[57] ABSTRACT

A torque variation in an internal combustion engine due to the combustion variations is detected at each predetermined period. An average torque variation to be compared with the detected torque variation is predetermined experimentally based on the engine speed and the intake manifold pressure and is stored in a memory. The number of the detected torque variations which exceed the average torque variation multiplied by a predetermined constant is counted, and if the ratio of the counted number to the total number of the detected torque variations is larger than a predetermined reference value, then the presence of a torque variation is determined.

10 Claims, 15 Drawing Figures

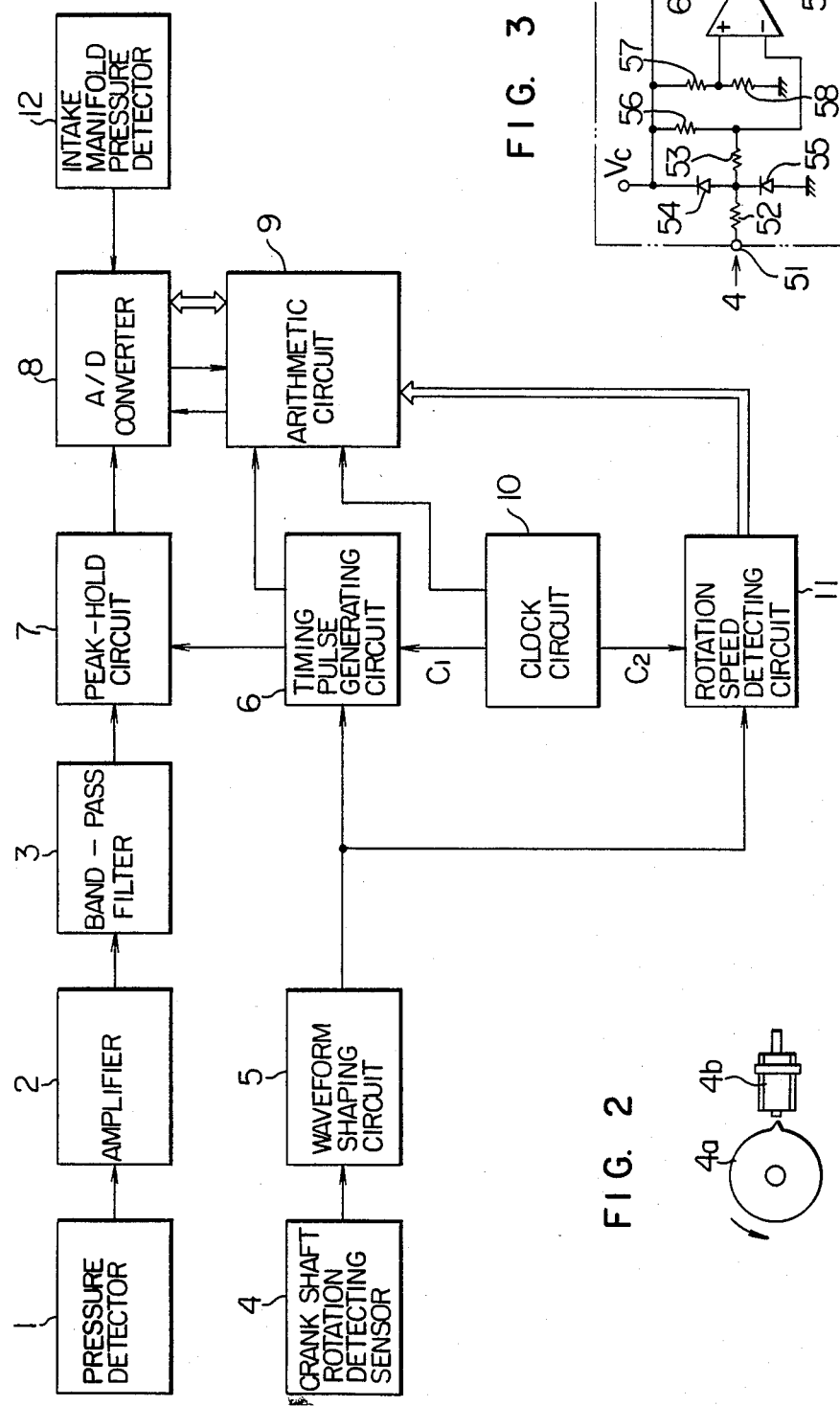

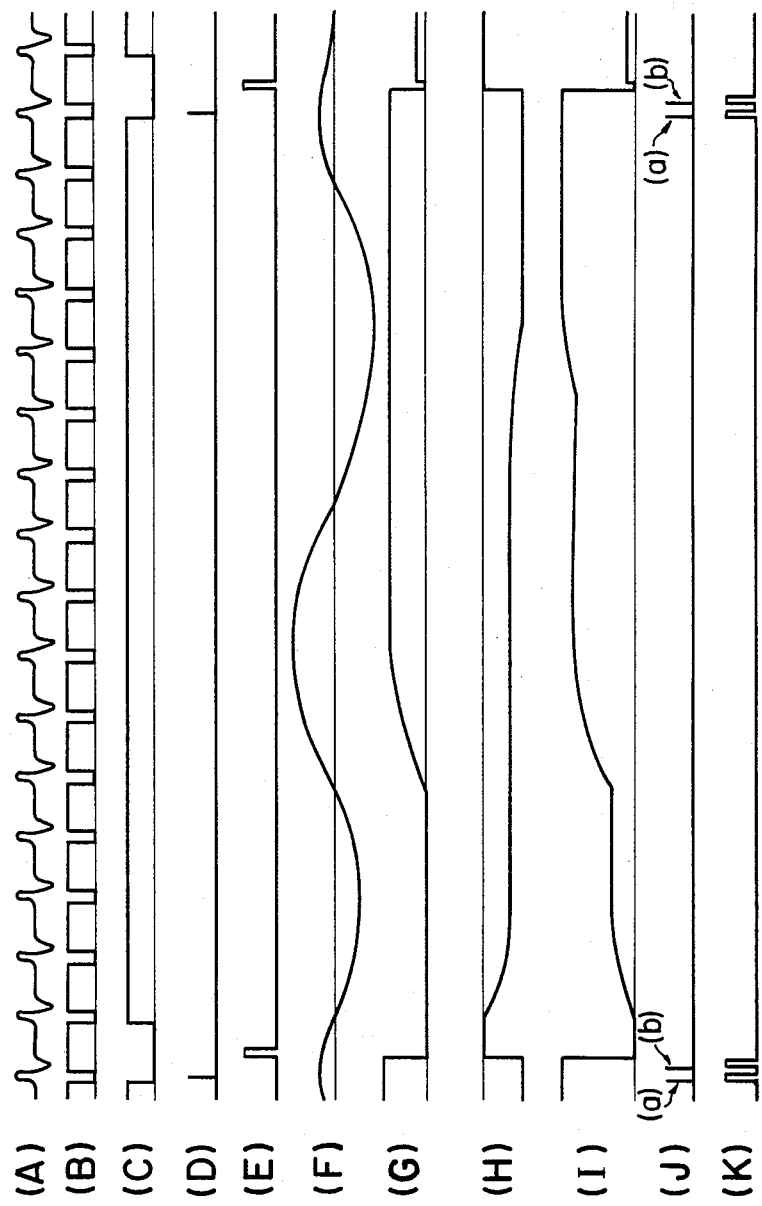

FIG. 11a

| | NE$_1$ | NE$_2$ | ----- | NE$_n$ | ----- | NE$_N$ |
|---|---|---|---|---|---|---|
| PB$_1$ | TA$_{1,1}$ | TA$_{2,1}$ | ----- | TA$_{n,1}$ | ----- | TA$_{N,1}$ |
| PB$_2$ | TA$_{1,2}$ | TA$_{2,2}$ | ----- | TA$_{n,2}$ | ----- | TA$_{N,2}$ |
| ⋮ | ⋮ | ⋮ | | ⋮ | | ⋮ |
| PB$_m$ | TA$_{1,m}$ | TA$_{2,m}$ | ----- | TA$_{n,m}$ | ----- | TA$_{N,m}$ |
| ⋮ | ⋮ | ⋮ | | ⋮ | | ⋮ |
| PB$_M$ | TA$_{1,M}$ | TA$_{2,M}$ | ----- | TA$_{n,M}$ | | TA$_{N,M}$ |

FIG. 11b

| | NE$_1$ | NE$_2$ | ----- | NE$_n$ | ----- | NE$_N$ |
|---|---|---|---|---|---|---|
| PB$_1$ | $\Sigma T_{1,1}$ / $N_{1,1}$ | $\Sigma T_{2,1}$ / $N_{2,1}$ | ----- | $\Sigma T_{n,1}$ / $N_{n,1}$ | ----- | $\Sigma T_{N,1}$ / $N_{N,1}$ |
| PB$_2$ | $\Sigma T_{1,2}$ / $N_{1,2}$ | $\Sigma T_{2,2}$ / $N_{2,2}$ | ----- | $\Sigma T_{n,2}$ / $N_{n,2}$ | ----- | $\Sigma T_{N,2}$ / $N_{N,2}$ |
| ⋮ | ⋮ | ⋮ | | ⋮ | | ⋮ |
| PB$_m$ | $\Sigma T_{1,m}$ / $N_{1,m}$ | $\Sigma T_{2,m}$ / $N_{2,m}$ | ----- | $\Sigma T_{n,m}$ / $N_{n,m}$ | ----- | $\Sigma T_{N,m}$ / $N_{N,m}$ |
| ⋮ | ⋮ | ⋮ | | ⋮ | | ⋮ |
| PB$_M$ | $\Sigma T_{1,M}$ / $N_{1,M}$ | $\Sigma T_{2,M}$ / $N_{2,M}$ | ----- | $\Sigma T_{n,M}$ / $N_{n,M}$ | ----- | $\Sigma T_{N,M}$ / $N_{N,M}$ |

FIG. 12
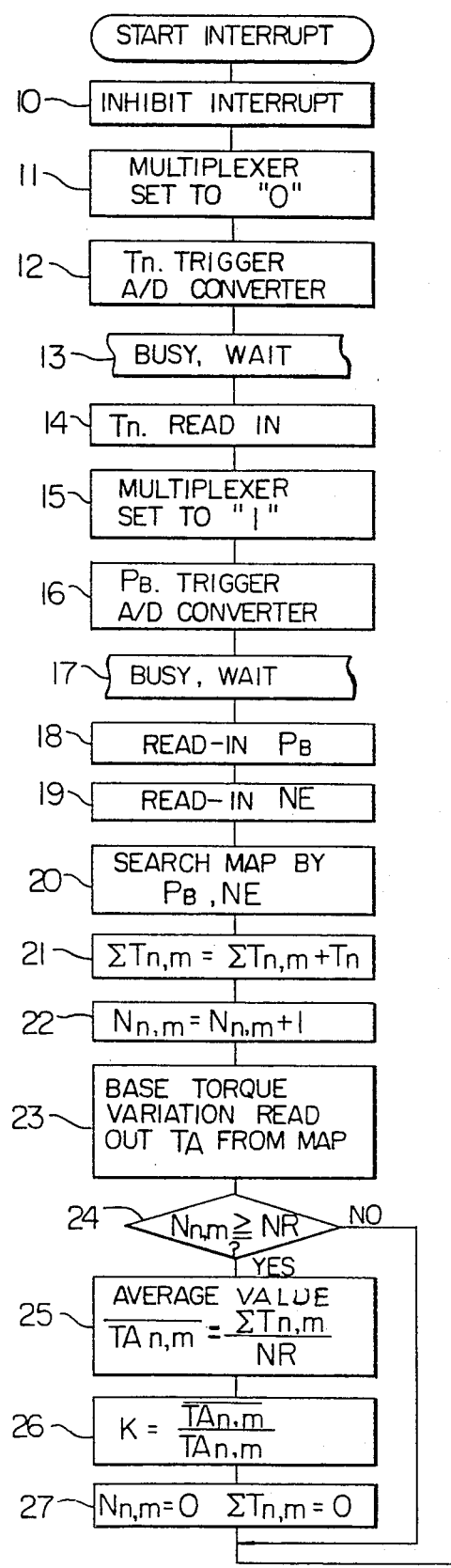
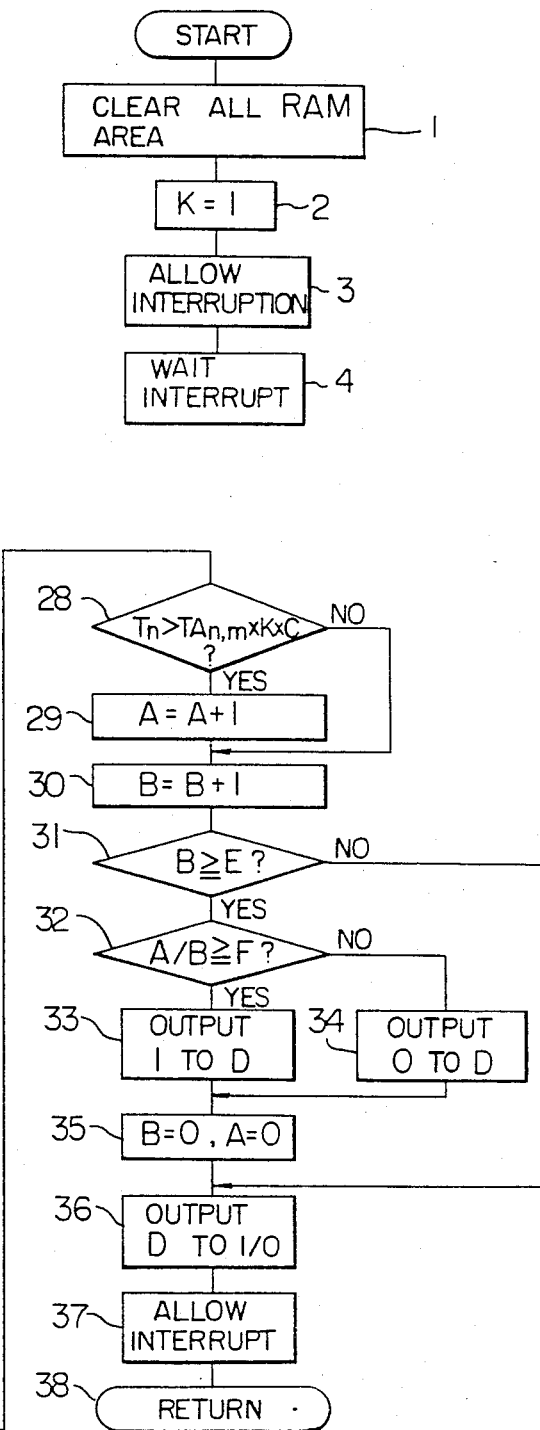

TORQUE VARIATION DETECTING METHOD AND APPARATUS FOR INTERNAL COMBUSTION ENGINE

BACKGROUND OF THE INVENTION

1. Field of the Invention

This invention relates to a torque variation detecting method and apparatus for an internal combustion engine which detects a torque variation caused by a combustion variation of the internal combustion engine.

2. Description of the Prior Art

There are known various apparatus for detecting a mechanical vibrational acceleration or combustion internal pressure vibration or a torsion of the crankshaft, thereby determining the presence or absence of a reportable torque variation on the basis of the detected output signals. However, these detecting means have considerable errors due to deterioration with age, etc., and cannot detect the torque variation correctly.

SUMMARY OF THE INVENTION

It is an object of this invention to provide a torque variation detecting method and apparatus which can correctly detect, the presence or absence of a reportable torque variation without being affected by engine speed, engine load, etc., of the engine.

According to this invention, an actual torque variation caused by the combustion variations of an internal combustion engine is detected during a predetermined constant period (for example, for a predetermined number of revolutions, or a predetermined length of time). Each detected actual torque variation value is then compared with an average value of the torque variation determined and stored in advance for the operating conditions of that particular engine. The presence or absence of a reportable torque variation is decided depending on whether a calculated ratio is larger or less than a predetermined reference value. The numerator of the ratio is the number of times that the actual torque variation exceeds the predetermined average value multiplied by a predetermined constant C, (ie No. of times $Tn > TA_{n,m} \times C$; where Tn is the actual torque variation and $TA_{n,m}$ is the predetermined average torque variation for a given engine speed and intake manifold pressure.). The denominator of the ratio is equal to the total number of times the torque comparison operation was performed.

In addition, according to another aspect of this invention, the predetermined average value of the torque variation determined and stored in advance, as mentioned above, is corrected by the average value of the actual torque variation. The corrected average value of torque variation is obtained by multiplying the predetermined average value $TA_{n,m}$ by a constant K. K is derived from the actual number of torque variations and will be described later herein. In this embodiment of the present invention, the presence or absence of a torque variation is also decided on whether the calculated ratio is less than or greater than the predetermined reference value. However, in this embodiment, the numerator of the calculated ratio is equal to the number of times $Tn > TA_{n,m} \times K \times C$. Therefore, the presence or absence of a reportable torque variation can be decided correctly with almost no interference due to the deterioration with age of the torque variation detecting devices and without influence of the engine speed, engine load, etc., of the engine.

BRIEF DESCRIPTION OF THE DRAWINGS

FIG. 1 is a block diagram of an embodiment of this invention.

FIG. 2 is a front view of a crankshaft rotation detecting sensor in the apparatus of FIG. 1.

FIG. 3 is an electric circuit diagram of a waveform-shaping circuit for waveform-shaping the output signal from the crankshaft rotation detecting sensor in the apparatus of FIG. 1.

FIG. 4 is a waveform diagram useful for explaining the operation of the apparatus of FIG. 1.

FIG. 11a shows a map of the average of torque variations stored in advance for each condition of the engine.

FIG. 11b shows a map for calculating the variation of torque variations for respective conditions of the engine.

FIG. 12 is a flow chart for the processing operation of the arithmetic circuit in another embodiment of this invention.

DESCRIPTION OF THE PREFERRED EMBODIMENTS

Figure 5:
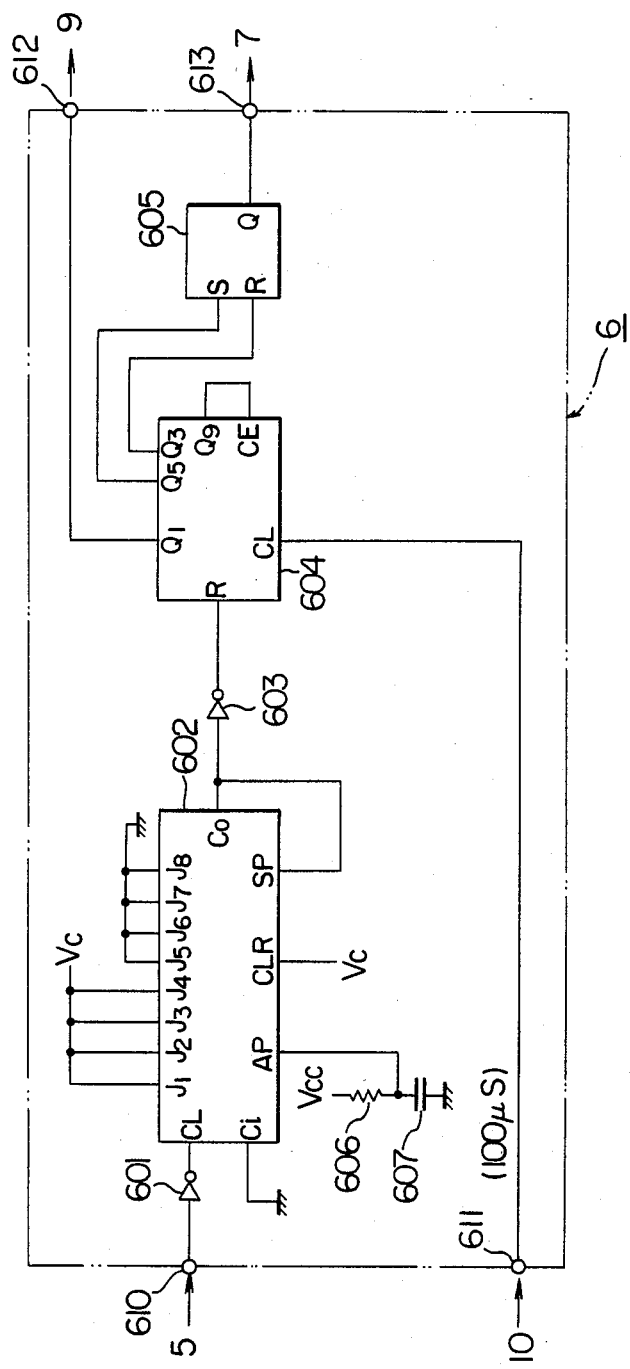
FIG. 5 is an electric circuit diagram of a timing pulse generating circuit in the apparatus of FIG. 1.

Embodiments of this invention will hereinafter be described with reference to the accompanying drawings. FIG. 1 shows an embodiment of this invention which is applied to a straight type 4-cylinder internal combustion engine (hereinafter, referred to simply as engine). Referring to FIG. 1, there is shown a pressure detector 1 with a piezoelectric element, which is commercially available. This detector 1 is attached to a rubber engine mount and is responsive to the pressure exerted by the engine on the engine mount. When running, the engine experiences variations in torque. These torque variations produce vibrations which are transmitted from the engine to the engine mount. Detector 1 is thus positioned to detect these vibrations and determine the acceleration thereof. The vibrational acceleration of the running engine is, therefore, proportional to the mechanical torque variations being exerted by the engine. Therefore, torque variations can be detected by monitoring the pressure variations at detector 1. The output of detector 1 is an analog signal proportional to the torque variation. An amplifier 2 is formed of a buffer and an amplifier, and is not described in detail because it is well known. A band-pass filter 3 transmits only the output of a frequency range from 1 Hz to several Hz, of the analog signal from the amplifier 2. This eliminates signals which may have been generated by vibrations not caused by torque variations, ie. auto-body vibrations etc. The output of bandpass filter 3 is shown at (F) in FIG. 4. The output varies between positive and negative in accordance with the pressure being exerted on detector 1 by the vibrational accelerations of the running engine. This filter 3 is of the model 852 made by Rockland.

A crank shaft rotation detecting sensor 4 is constructed as shown in FIG. 2, in which 4a represents a disk made of iron mounted on a crank shaft and which has a projection provided at a position 90° before the top dead center of the first and fourth cylinders, and 4b an electromagnetic pickup which is a sensor for generating a signal when it comes to a position opposite to the projection of the disk 4a.

A waveform shaping circuit 5 shapes the waveform of the signal from the crank shaft rotation detecting sensor 4. FIG. 3 shows a circuit arrangement of circuit 5. In FIG. 3, one end of a resistor 52 is connected to an input terminal 51 and the other end of the resistor 52 is connected to the common junction of one end of a resistor 53, the positive polarity of a diode 54 and the negative polarity of a diode 55. The other end of the resistor 53 is connected to the inverting input terminal of a comparator 59 (IC No. 3302 made by the Motorola). The positive polarity of the diode 55 is grounded. One end of a resistor 56 is connected to the other end of the resistor 53, and the other end of resistor 56 is connected to the negative polarity of the diode 54. One end of a resistor 57 is connected to the negative polarity of the diode 54, and the other end thereof to one end of a resistor 58, the other end of which is grounded. The connection point between the resistors 57 and 58 is connected to the non-inverting input terminal of comparator 59. The output of the comparator 59 is of open-collector configuration, and hence a resistor 60 is connected between the output of the comparator 59 and a source voltage $V_c$. The impedance from the non-inverting input terminal of the comparator 59 toward the resistor side is made to be equal to the impedance from the inverting-input terminal toward the resistor side by properly selecting values of the resistors. The non-inverting input terminal of the comparator 59 is kept at about ⅓ of the source voltage $V_c$. The diode 55 serves to keep the inverting-input terminal at a voltage higher than $-0.5$ V and the diode 54 serves to keep the inverting-input terminal at a voltage lower than $+V_c+0.5$ V. Each time the projection of the disk 4a passes by the electromagnetic pickup 4b, a signal of such waveform as shown in (A) in FIG. 4 is generated from the pickup 4b, and then the comparator 59 produces a waveform-shaped pulse as shown in (B) in FIG. 4.

Based on the signal received from the crankshaft rotation detection sensor 4, a timing pulse generating circuit 6 serves to generate a reset signal to a peak-hold circuit 7 and an interruption signal to an arithmetic circuit 9.

FIG. 5 shows a circuit arrangement of the timing pulse generating circuit 6. In FIG. 5, the input of an inverter 601 is connected to the output of the waveform shaping circuit 5, and the output of the inverter 601 is connected to the clock input of a binary counter 602. The counter 602 is an IC made by RCA and has its carry-in terminal grounded, its clear terminal connected to the source voltage $V_c$ and its carry-out terminal connected to its synchronizing preset terminal and to the input terminal of an inverter 603. One end of a resistor 606 is connected to the source voltage $V_c$ and the other end thereof is connected to the positive polarity of a capacitor 607 to the non-synchronizing preset terminal of the counter 602. The negative polarity of the capacitor 607 is grounded. The output of the inverter 603 is connected to the reset terminal of a counter 604 which includes a divider. The counter 604 with a divider is IC-CD4017 made by RCA, and has a clock terminal to which is supplied a clock of 10 kHz from a clock circuit 10. The output $Q_1$ of the counter 604 is connected to the arithmetic circuit 9 through a terminal 612. The outputs $Q_5$ and $Q_8$ of the counter 604 are connected to the set and reset terminals of an R-S flip-flop 605, respectively, and the output $Q_9$ thereof is connected to the clock enable terminal thereof. The output Q of the R-S flip-flop 605 is connected to the peak-hold circuit 7 through a terminal 613.

The operation of the timing pulse generating circuit 6 will be described. To the clock terminal of the counter 602 is supplied a pulse of (B) in FIG. 4 through the inverter 601, and as a result the counter 602 produces at its carry-out terminal a pulse of (C) in FIG. 4. This pulse which has 1/16 the input clock frequency in which 16 is the sum of 1 and "15" at which the counter 602 is set. The divider-including counter 604 is reset by applying the pulse of (C) in FIG. 4 through the inverter 603 to the reset terminal thereof. When the pulse is turned from "1" to "0", the counter 604 starts to count. Also, the counter 604 is supplied at its clock input with a clock signal $C_1$ of 10 kHz. Thus, when the first pulse enters, the counter 604 produces at its output $Q_1$ a pulse. When the ninth pulse enters, the output $Q_9$ becomes a "1", and the clock enable terminal a "1". Therefore, the counter 604 is inhibited from counting the applied clock pulses until the counter 604 is again reset. Accordingly, at the output $Q_1$ appears a pulse as shown in (D) in FIG. 4. This output pulse is supplied through the terminal 612 to the arithmetic circuit 9, triggering the circuit 9 to cause it to start various operations. The output $Q_5$ sets the R-S flip-flop and the output $Q_8$ resets it, with the result that the R-S flip-flop 605 produces at its output Q a pulse as shown in (E) in FIG. 4. This pulse is supplied through the terminal 613 to the peak-hold circuit 7, resetting it. The pulse width of this pulse is about 300 μs.

Figure 6:
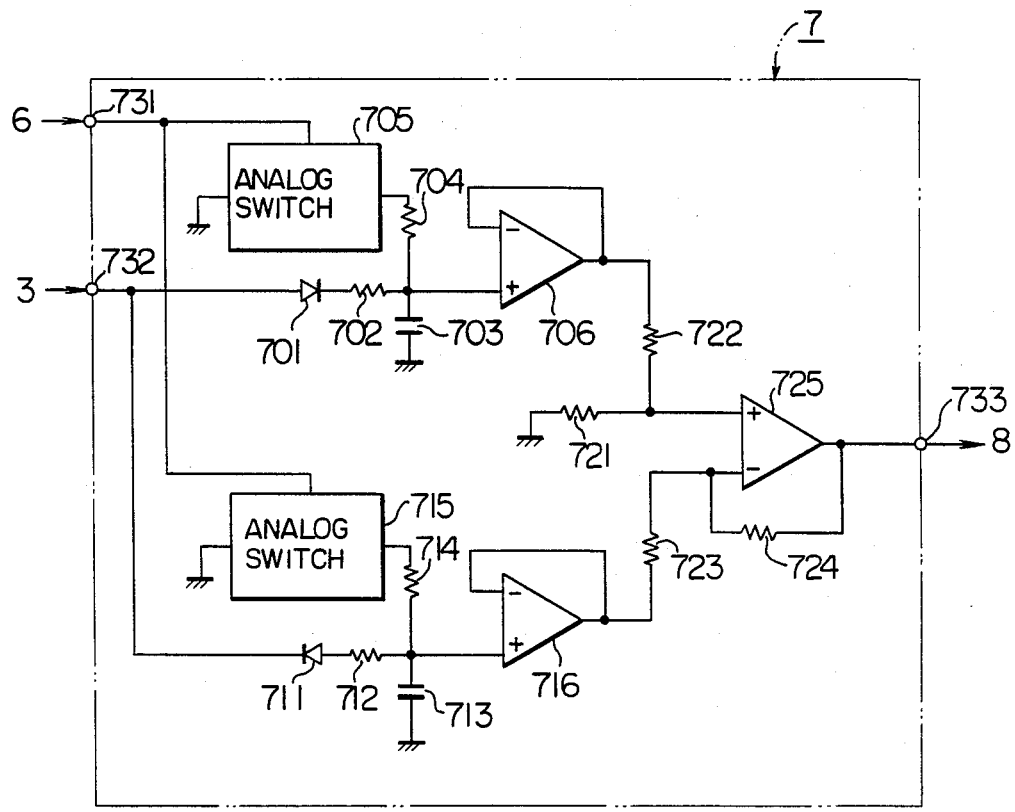
FIG. 6 is an electric circuit diagram of a peak-hold circuit in the apparatus of FIG. 1.

FIG. 6 shows a circuit arrangement of the peak-hold circuit 7. In FIG. 6, the positive polarity of a diode 701 is connected to the negative polarity of a diode 711, the junction therebetween being connected to the output of the band-pass filter 3. The negative polarity of the diode 701 is connected to one terminal of a resistor 702. The other terminal of the resistor 702 is connected to the positive polarity of a capacitor 703, the non-inverted input of a buffer amplifier 706 and a resistor 704. The negative polarity of the capacitor 703 is grounded. The other end of the resistor 704 is connected to one end of an analog switch 705. The other end of the analog switch 705 is grounded, and the control terminal thereof is connected to the terminal 613 of the timing pulse generating circuit 6. The inverting input of the buffer amplifier 706 is connected to its own output. The positive polarity of the diode 711 is connected to one end of a resistor 712. The other end of the resistor 712 is connected to the negative polarity of a capacitor 713, the non-inverting input of a buffer amplifier 716 and a resistor 714. The positive polarity of the capacitor 713 is grounded, and the other end of the resistor 714 is connected to one end of an analog switch 715. The other end of the analog switch 715 is grounded, and the control terminal thereof is connected to the terminal 613 of the timing pulse generating circuit 6. The inverting input of the buffer amplifier 716 is connected to its own output. The output of the buffer amplifier 706 is connected to one terminal of a resistor 722. The other terminal of resistor 722 is connected to the non-inverting input of buffer amplifier 725 and to one end of the resistor 721, the other end of the resistor 721 is grounded. The output of the buffer amplifier 716 is connected to one end of a resistor 723, and the other end thereof is connected to the inverting input of a buffer amplifier 725. The output of the buffer amplifier 725 is supplied to the A/D converter circuit 8, and connected to one end of a resistor 724. The other end of the resistor 724 is connected to the inverting input of the buffer amplifier 725.

The operation of the peak-hold circuit 7 will be described. When the pulse of (E) in FIG. 4 is supplied from the timing pulse generating circuit 6 to the control inputs of the analog switches 705 and 715, the analog switches 705 and 715 are closed to permit the charges in the capacitors 703 and 713 to discharge through the resistors 704 and 714 which are of low resistance value. Thus, the voltages across the capacitors 703 and 713 are reset to 0 V. Thereafter, the output waveform of (F) in FIG. 4 from the band-pass filter 3 is applied through the input terminal 732, the diode 701, and the resistor 702 to the capacitor 703, which is then charged to a positive voltage. Thus, a positive peak voltage is held at the capacitor 703 for the period between the resetting times. The voltage across the capacitor 703 is supplied to the buffer amplifier 706, which is of high-input impedance and which thus produces a signal of the waveform of (G) in FIG. 4. Also, the signal of the waveform shown in (F) in FIG. 4 is supplied through the input terminal 732, diode 711, and resistor 712 to the capacitor 713, which is thus charged to the negative voltage. A negative peak voltage is thus held at this capacitor 713 for the period between the resetting times and the voltage across the capacitor 713 is reset to zero. The voltage across the capacitor 713 is supplied to the buffer amplifier 716, which is of high-input impedance and which thus produces output of the waveform shown in (H) in FIG. 4. The outputs of the buffer amplifiers 706 and 716 are supplied to the differential amplifier 725, which thus produces the difference between the positive and negative peaks during the period between the resetting times, as shown in (I) in FIG. 4.

Figure 7:
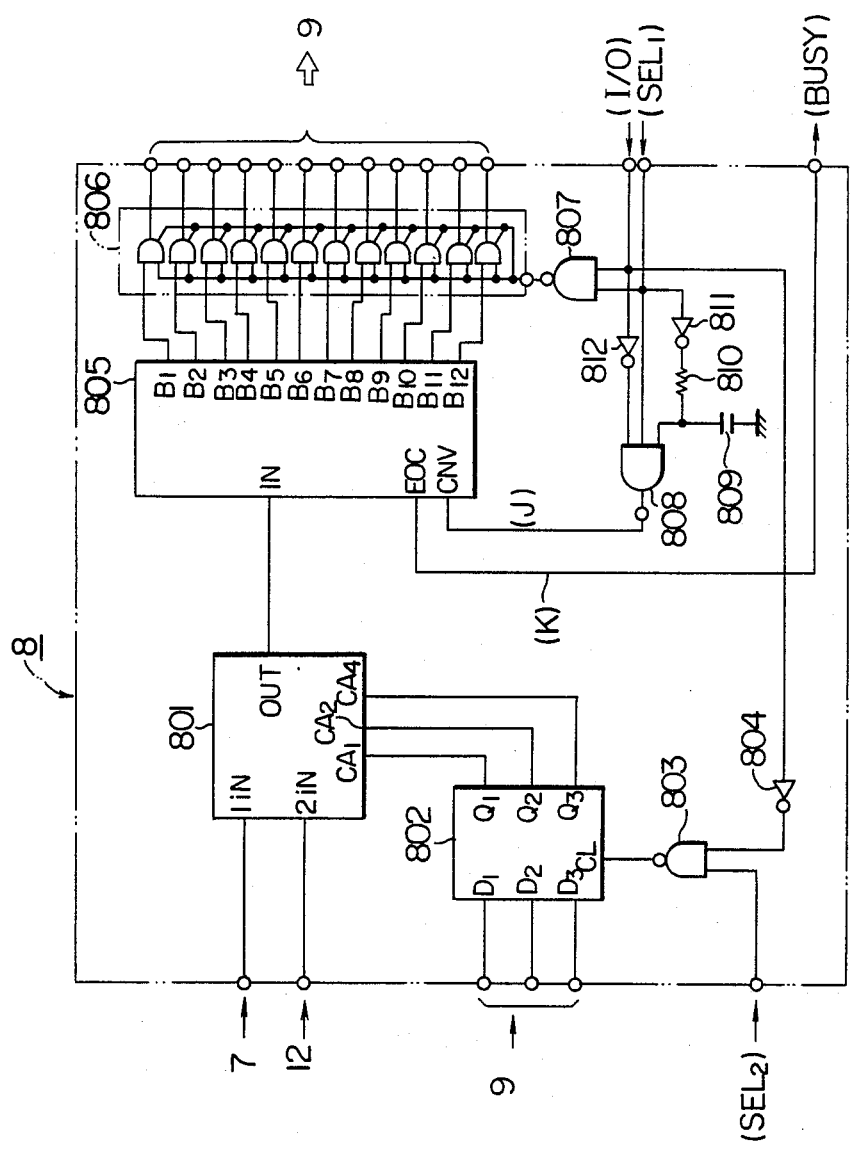
FIG. 7 is an electric circuit diagram of an A/D converting circuit in the apparatus of FIG. 1.

FIG. 7 shows a circuit arrangement of an A/D converter 8. An I/O signal from an arithmetic circuit which will be described later, is inverted by an inverter 804 and then supplied to a NAND gate 803. A device select signal (SEL2) is supplied directly to the NAND gate 803. The output of the NAND gate 803 is supplied to the clock terminal CL of a shift register 802. The shift register 802 may be, for example, IC-CD 4035 made by RCA. This register 802 stores data on the bus line from the arithmetic circuit 9 and supplies it to an analog multiplexer 801. To the first input 1 iN of the analog multiplexer 801 is supplied the output from the peak-hold circuit 7. To the second input 2 iN of the analog multiplier 801 is supplied the output of the output detector 12. The output terminal OUT of the analog multiplexer 801 is connected to the input terminal IN of an A/D converter 805. The analog multiplexer 801 is MX-808 made by Datel and the A/D converter 805 is ADC-80AG-12 made by Burr-Brown Co., Ltd.

The I/O signal from the arithmetic circuit 9 is also directly supplied to a NAND gate 807, and it is also inverted by an inverter 812 and supplied to a NAND gate 808. A device select signal SEL1 from the arithmetic circuit 9 is directly supplied to the NAND gates 807 and 808. An inverter 811, a resistor 810 and a capacitor 809 constitute a delay circuit. The SEL1 signal is inputted through this delay circuit to the AND circuit 808. THus, the AND circuit 808 produces a pulse signal of about 100 μsec of duration shown in (J) in FIG. 4, which is supplied to an A/D conversion command terminal CNV of a successive comparison type A/D converter 805. A conversion end terminal EOC of the A/D converter 805 is connected to a busy terminal BUSY of the arithmetic circuit 9. Output terminals B1 to B12 of A/D converter 805 are connected through a three-state buffer 806 to the bus line to the arithmetic circuit 9.

The operation of the A/D converter 8 will be described. When the pulse shown in (D) in FIG. 4 is supplied from the timing pulse generator 6 to the arithmetic circuit 9, the arithmetic circuit 9 executes the program for A/D conversion process as a result of interruption of the program which has been executed so far. In this program, binary code "000" is set at the channel address CA1, CA2 and CA4 of the analog multiplexer 801, and the analog signal is inputted to the first input 1 iN from the peak-hold circuit 7 and then selected. The output of the multiplexer 801 is supplied to the A/D converter 805. Then, when an A/D conversion start command is issued from the arithmetic circuit 9, the pulse of (J) in FIG. 4 is applied to the A/D conversion command terminal CNV of the A/D converter 805, thereby causing the converting operation to start at the leading edge of the first pulse. At the same time, the output signal at the conversion end terminal EOC (as shown in (K) in FIG. 4) is raised up to "1" level. The conversion end terminal EOC is then connected to the busy terminal BUSY of a device unit DCU of the arithmetic circuit 9. The read-in command for the analog signal from the peak-hold circuit 7 is not executed until the output signal at the conversion end terminal EOC falls off to "0" level. During the period until this falling off of output signal, the I/O signal and SEL signal are both held at "1" level. The successive comparison type A/D converter 805 carries out converting operations while the output at the EOC terminal is kept at 37 1" level, so as to produce binary data signals at its output terminals B1 to B12. When the A/D conversion operation is completed, the output signal at the conversion end terminal EOC becomes "0" level, releasing the arithmetic circuit 9 from its waiting condition and allows it to execute the read-in command. As a result, the analog signal data from the peak-hold circuit 7 is read in the arithmetic circuit 9. Then, the arithmetic circuit 9 causes the channel address terminal of the analog multiplexer 801 to be set at binary code of "001", so that a second analog signal is provided at input 2 iN of analog multiplexer 801. This second signal is inputted from an intake manifold pressure detector 12. Detector 12 is a commercially available pressure detector which generates an analog signal which is proportional to the suction tube pressure of the engine. The intake manifold pressure signal at the second input 2 iN is supplied to the A/D converter 805. Thereafter, the suction tube pressure data is read into the arithmetic circuit 9 in the same manner as in the A/D conversion of the first input signal.

Figure 8:
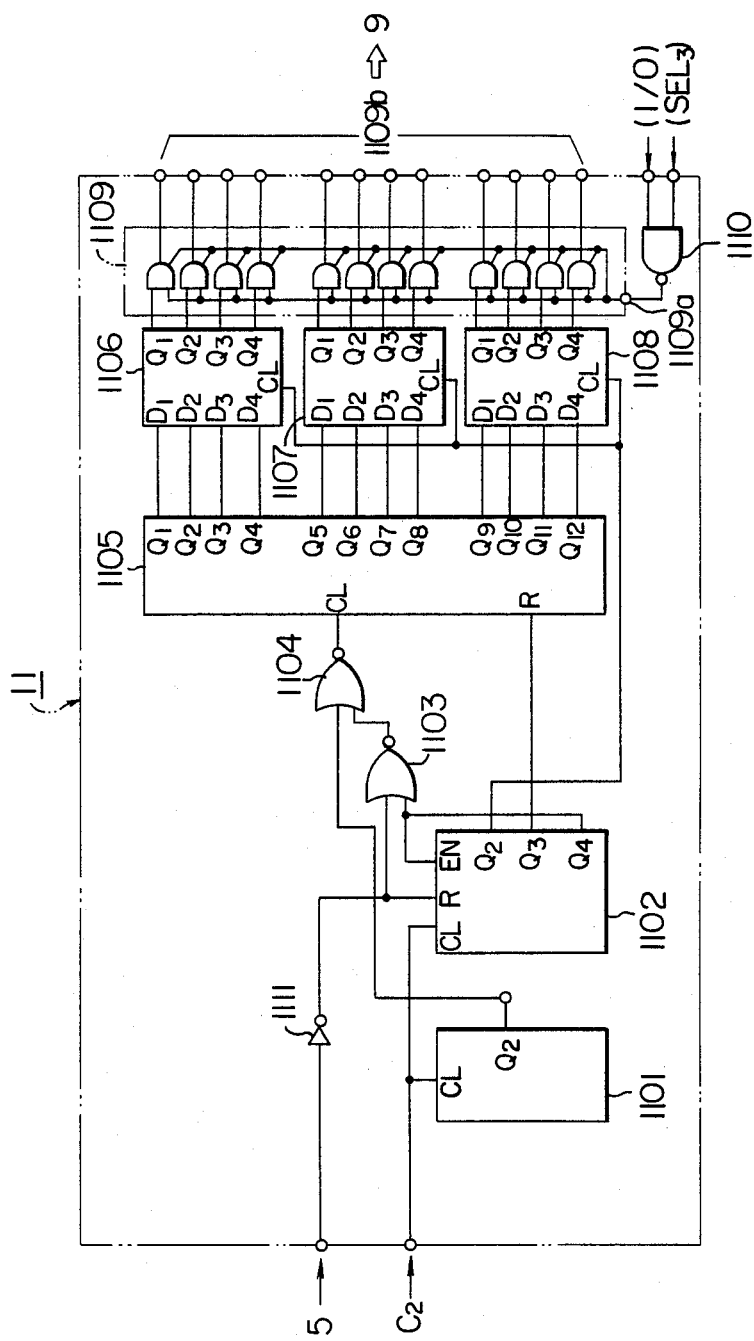
FIG. 8 is an electric circuit of a rotational speed detecting circuit in the apparatus of FIG. 1.

A rotation speed detecting circuit 11 will be described with reference to FIG. 8. A binary counter 1101 serves to count a clock pulse signal C2 supplied at its clock terminal CL, and thereby divide the frequency of the input pulse. This counter is, for example, CD4024 made by RCA. Therefore, this counter 1101 divides the clock pulse signal C2 (which is about 128 kHz shown in (C) in FIG. 9) and produces at its output end $Q_2$ a pulse signal of about 32 kHz shown in (D) in FIG. 9. A counter 1102 with divider fundamentally serves to count the clock pulse signal $C_2$ supplied to the terminal CL and produce output signal of "1" level at one of the output terminals $Q_2$ to $Q_4$. In addition, when a signal of "1" level is supplied to the count operation stop terminal EN, the counter 1102 stops counting.

In this embodiment, the output terminal $Q_4$ of counter 1102 is connected to its own stop terminal EN, and thus when the output at the output terminal $Q_4$ is "1" level, the "1"-level signal appears at the stop terminal EN, inhibiting the counting operation. Thus, a timing pulse signal shown in (B) in FIG. 9, resulting from waveform-shaping the signal ((A) in FIG. 9) from the crank shaft rotation detecting sensor 4 by the waveform shaping circuit 5, is supplied through an inverter 1111 to the reset terminal R of the counter 1102, resetting it so that the output terminal $Q_4$ is at "0" level as shown in (G) in FIG. 9. After a time T elapses, the reset terminal R switches to "0" level, and the counter 1102 starts to count and produces at its output terminals $Q_2$ and $Q_3$ pulse signals shown as (E) and (F) respectively in FIG. 9. Thereafter, when the output at the output terminal $Q_4$ becomes "1" level, the counter 1102 again stops counting. The output signals from the counters 1101, 1102 and inverter 1111 are supplied through NOR gates 1103 and 1104 to the clock terminal CL of a 12-bit counter 1105, and the $Q_3$-output of the counter 1102 is applied to the reset terminal R of the counter 1105.

Figure 9:
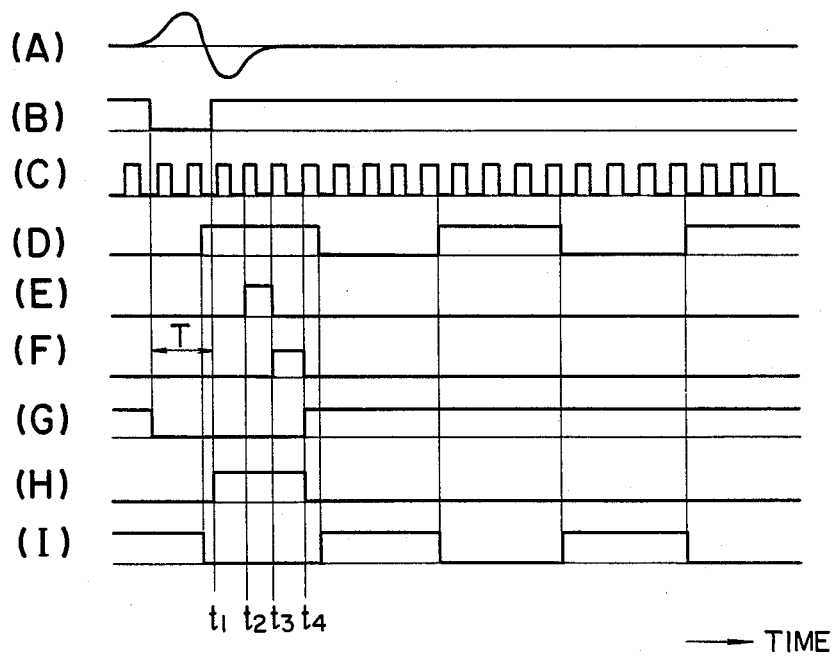
FIG. 9 is a waveform diagram useful for explaining the operation of the rotational speed detecting circuit of FIG. 8.

In other words, the output signal from the waveform shaping circuit 5, as shown in (B) in FIG. 9, is supplied through the inverter 1111 to the NOR gate 1103 together with the $Q_3$-output of the counter 1102 shown in (G) in FIG. 9. Thus the NOR gate 1103 produces a pulse signal shown in (H) in FIG. 9. This pulse signal from the NOR gate 1103 is supplied to the NOR gate 1104 together with the output signal from the counter 1101 shown in (D) in FIG. 9. Thus the NOR gate 1104 produces a pulse signal as shown in (I) in FIG. 9. The pulse signal from the NOR gate 1104 is supplied to the counter 1105.

Here, at time t1 when the timing pulse shown in (B) in FIG. 9 is switched "1" level and the output of the NOR gate 1104 becomes "1" level (as shown in (H) in FIG. 9) the counter 1105 stops counting. Then at time $t_2$, the outputs of the output terminals $Q_1$ to $Q_{12}$ of the counter 1105 are temporarily stored in shift registers 1106 to 1108 (CD4035 made by RCA) in response to the leading edge of the $Q_2$-output of the counter 1102. Subsequently, at time t3, when the $Q_3$-output of the counter 1102 becomes "1" level, the counter 1105 is reset and at time t4, when the $Q_4$-output of the counter 1102 becomes "1" level, the counter again starts to count.

The operation of counter 1105 is repeated in synchronization with the timing pulse signal supplied each time the electromagnetic pickup 4b detects the reference projection 4a. Therefore, the shift registers 1106 to 1108 produce, at the output terminals $Q_1$ to $Q_4$ of each, the binary signals which are proportional to the reciprocal 1/N of the rotational speed N of the engine. A three-state buffer 1109 offers a high output-impedance while a "1" level signal is being supplied to its control terminal 1109a, and the output terminal group 1109b thereof is connected through bus lines to the arithmetic circuit 9.

To the control terminal 1109a is supplied an output signal from a NAND gate 1110. To the NAND gate 1110 is supplied an input/output control signal (I/O signal) from a device control unit (DCU) incorporated in the arithmetic circuit 9 and a device select signal (SEL3). When the output signal from the NAND gate 1110 becomes a "0" level, the binary signals proportional to 1/N are supplied from the shift registers 1106 and 1108 to the arithmetic circuit 9.

A clock circuit 10 is formed of an oscillation circuit using a crystal resonator, and a counter for dividing the frequency of the signal from the oscillation circuit. Since well clock circuit is thus known, the circuit arrangement and the detailed description wil be omitted.

Figure 10:
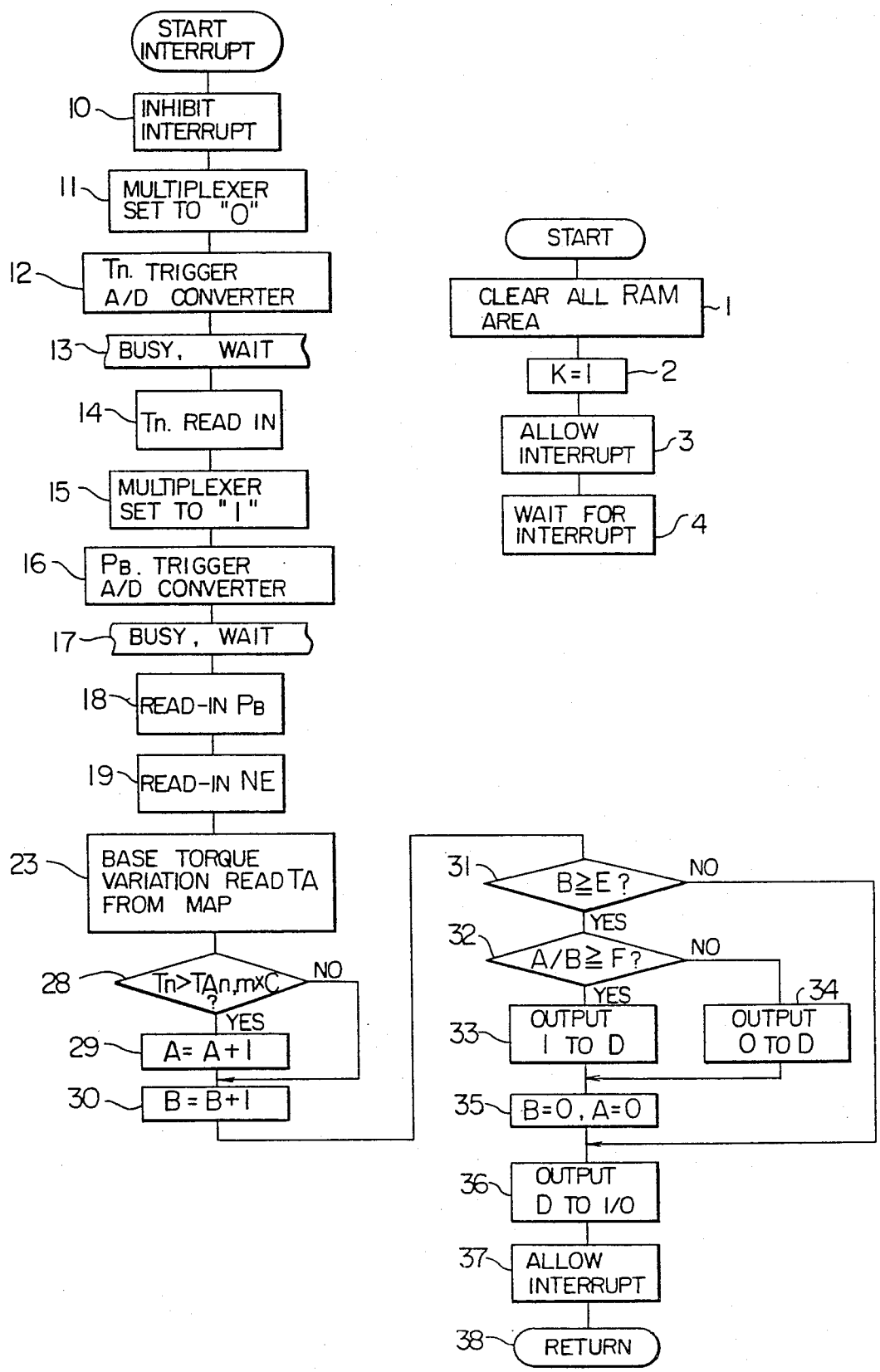
FIG. 10 is a flow chart for the processing operation of an arithmetic circuit in the apparatus of FIG. 1.

The arithmetic circuit (hereinafter, referred to as CPU) 9 will be described. The arithmetic circuit 9 is a 12-bit microcomputer TLCS-12 made by Toshiba Electric Co. The operation of the CPU 9 will be described with reference to the flow chart of FIG. 10. A key switch (not shown) is turned on to connect the power supply, thereby starting the operation. At step 1, all memories (hereinafter, referred to as RAM) are cleared to 0, and at step 2 the correction coefficient is made K=1. At step 3, a master mask is set, to allow the interruption signal, and then at step 4, interruption computation is waited for. Except when the interruption computation is executed, the condition at step 4 is always brought about. When the engine starts to rotate, the timing pulse generating circuit 6 produces the pulse of (D) in FIG. 4 thereby starting interruption computation. When the computation is started by interruption, at step 10 the subsequent interruption is inhibited. At step 11, the multiplexer 801 in FIG. 7 is set to 0 so that the torque variation signal from the peak-hold circuit 7 is supplied to the A/D converter 805. Then, at step 12, a pulse (a) of the pulses shown in (J) in FIG. 4 is generated, and triggers the A/D converter 805 to start A/D conversion and at the same time the pulse of (K) in FIG. 4 at the EOC terminal becomes "1". This at step 13 the CPU 9 stops the computation during this period where the EOC terminals is at level "1". When the A/D converter 805 finishes the A/D conversion, the pulse of (K) in FIG. 4 becomes "0" and the CPU 9 resumes the computation. At step 14, the torque variation value Tn produced from the A/D converter 805 is read into the CPU 9. Also, at steps 11, 12, 13 and 14, the intake manifold pressure value PB is A/D converted and read into the CPU 9 in the same way as in the A/D conversion of the torque variation value. At step 19, the value 1/NE (reversely proportional to the engine rpm counted at the rotation speed detecting circuit 11) is read in, and the reciprocal of this value is obtained to determine the engine rpm NE.

FIG. 11a shows a data map of the average of experimentally measured torque variation values which correspond to the engine rpm NE and the intake manifold pressure PB. This data map is stored in the read-only memory (hereinafter, referred to as ROM).

At step 23, from the data map in FIG. 11a are read out the average values TAn,m of the torque variations corresponding to the engine rpm NE and the intake manifold pressure PB. At step 28, a decision is made as to whether or not the torque variation value Tn is larger than the torque variation average-value TAn,m multiplied by a set value C. If the decision is YES, the program goes to step 29, but if the decision is NO, the program goes to step 30. The set value C is used to make the level for discriminating the presence or absence of the torque variation C times as large as the average torque variation. At step 29, the number of times A that an event represented by Tn>TAn,m×C occurs is counted. At step 30 the number B of the total number of performed discrimination operations of the torque variation is counted. regardless of whether or not Tn>TAn,M x C. At step 31, a decision is made as to whether the total number of discrimination operations have been performed a predetermined number of times E or not. If the decision is YES, the program goes to step 32, where a comparison is made between a predetermined number F (representing a reference ratio for determining the presence of the torque variation) and the actual ration A/B (which is the number of times Tn>TAn,m×C divided by the total number of discrimination operations). If the reference ratio F is smaller than or equal to the actual ratio A/B, the program goes to step 33, where "1" is stored in a memory D. If the ratio F is greater than A/B, the program goes to step 34, where 0 is stored in the memory D. At step 35, the counts A and B are made 0, and at step 36 the contents of the memory D are supplied to the I/O. At step 37, interruption is allowed and at step 38, the state in which the program is executed before the interruption occurs is returned to.

Assuming that E=1 and F=0 are established, each time the actual torque variation is determined to be larger than C times the average value of the torque variation stored in advance, the decision is made that the torque variation is present and a "1" is output to memory D which then outputs to the I/O.

Figure 13:
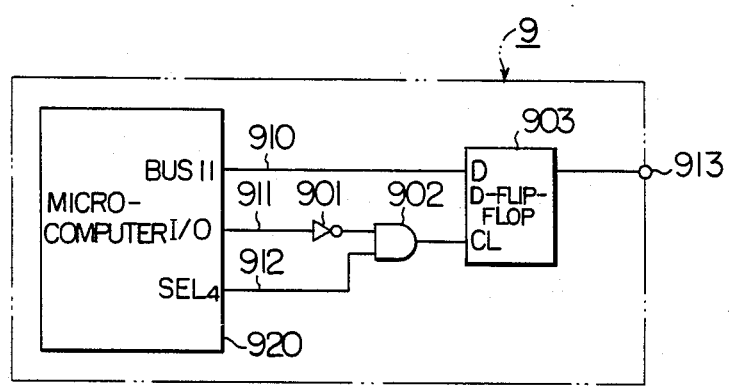
FIG. 13 is an electric circuit diagram of the arithmetic circuit in the apparatus of FIG. 1.

An explanation will now be made with reference to FIG. 13 for such a case in which the calculated results are supplied to the I/O. This I/O circuit is included in the arithmetic circuit 9. When a terminal 912 is made a "1" by the SEL signal from the microcomputer 920 and a terminal 911 is made a "0" by an I/O signal from the microcomputer 920, and a terminal 911 is made a "0" by an I/O signal from the microcomputer 920, data is transferred from the microcomputer to the device 903. The I/O signal is inverted by an inverter 901, and when the inverted signal and a device select signal (SEL4) are both at "1", a D-flip-flop 903 is supplied at its clock input with a pulse which has risen up to "1" from "0". Consequently, the value on the bus line BUS 11 is stored in the flip-flop 903, which then supplies its output to its output end, or to an output 913 of the arithmetic circuit 9. At step 31 in the flow chart of FIG. 10, the bus line BUS 11 has a binary number of "000000000001" or "000000000000". The "1" or "0" on the BUS 11 is stored in the D-flip-flop 903 and produced therefrom. In other words, the presence or absence of torque variation can be decided by the signal of "1" or "0" at the output terminal 913.

Another embodiment of this invention will now be described. The whole arrangement is similar to that of the embodiment of FIG. 1. Different parts of the arithmetic processing will be described with reference to the flow chart of FIG. 12. In this embodiment a determination is made of a deviation between the average of the torque variation (which was experimentally determined and stored in advance) and the average of the actual torque variations (for example, a ratio can be determined between both average values). The average value of the stored torque variation can then be corrected in accordance with this deviation. The corrected average value is then compared with the actual torque variation, and the presence or absence of torque variation is thus decided on the basis of the corrected average value.

FIG. 11b shows a map of the accumulated value of the torque variation and the number of samples corresponding to the engine rpm and the intake manifold pressure the same as in FIG. 11a. The addresses are assigned in RAM region. In FIG. 12, steps 10 to 19 are the same as steps 10 to 19 in FIG. 10 and are discussed above. At step 20, the address of the obtained torque variation Tn is searched with respect to the engine rpm NE and intake manifold pressure PB in FIG. 11b. At steps 21 and 22, the accumulated value $\Sigma$Tn,m of torque variation and the number of samples Nn,m are stored at the corresponding address of the memory. At step 23, the average value TAn,m of torque variation corresponding to the engine rpm NE and the intake manifold pressure PB is read out from the map data of FIG. 11a. At step 24, a decision is made as to whether the number of samples Nn,m is larger than a set value NR. If the decision is YES, the program goes to step 25, and if the decision is NO, the program goes to step 28. At step 25, the accumulated value $\Sigma$Tn,m is divided by the set value NR, thus the average value $\overline{TAn,m}$ is obtaind. At step 26, the average value $\overline{TAn,m}$ is divided by the average value TAn,m of torque variation determined experimentally in advance, thereby the ratio K of the two values is obtained. From the ratio K, the deterioration with age of the sensitivity of the pressure detector 1 for detecting torque variation can be determined. At step 27, the accumulated value $\Sigma$Tn,m of torque variation and the number of samples Nn,m used at steps 24, 25 and 26 are cleared. At step 28, a decision is made as to whether the torque variation Tn is larger than the torque-variation average value TAN,m multiplied by the correction coefficient K (for compensating for the deterioration of the pressure detector with age) and set value C. If the decision is YES, the program goes to step 29, and if the decision is NO, the program goes to step 30. The set value C, as described previously, is selected depending on the desired level for deciding the presence or absence of the torque variation. The processing at the following steps is similar to the embodiment described previously.

Figure 14:
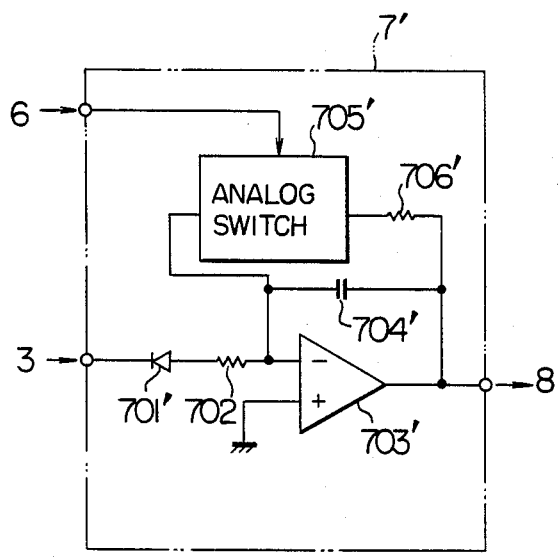
FIG. 14 is an electric circuit diagram of an integrating circuit used instead of the peak-hold circuit in the apparatus of FIG. 1.

While in these two embodiments the peak-hold circuit 7 is used in order to obtain the peak of the torque variation waveform, an integration circuit 7' shown in FIG. 14 may be used instead of the peak-hold circuit 7 in order to obtain the integrated value of the variation waveform during a predetermined interval.

In FIG. 14, a diode 701' allows a negative torque variation waveform to pass therethrough. The integrator is formed of a resistor 702', a capacitor 704', an analog switch 705' and a resistor 706'. The analog switch 705' is opened by applying the pulse of (E) in FIG. 4 from the timing generating circuit 6 to its control input, so as to discharge the charge in the capacitor 704', thus starting the integration. In this case, since a negative voltage is applied to the input of the integrator, the integrator produces a positive voltage. The integrated value is converted to a digital value by the A/D converter 8, and this converted value is the integrated value of a variation waveform within a predetermined interval. Since the integrated value increases as the torque variation increases, this value is processed by the arithmetic circuit 9 in the same way as above, wherein the arithmetic circuit 9 produces a signal for deciding the presence or absence of the torque variation.

While in the above embodiments the predetermined sample interval is obtained as a predetermined number of revolutions of engine by the timing pulse generating circuit 6, a clock of 10-msec period can be supplied to the input terminal 610 of the timing pulse generating circuit 6 in FIG. 5 from the clock circuit 10. The counter 602 can be set at "49", thereby, a predetermined sample interval of time, for example, 500 msec is obtained.

Moreover, the torque variation detecting means may be any type capable of detecting the combustion variation.

In this way, whether a torque variation occurs can be decided by observing the output waveform at the output end 913 of the arithmetic circuit 9. If an indicating lamp and a driving circuit are added at the output end 913, so that the lamp is turned on when the output end is at "1", and the lamp is turned off when the output end is at "0", it is apparent that whether a torque variation occurs can be detected by observing the indicating lamp.

Thus, the torque variation signal produced at the output end 913 of the arithmetic circuit 9 upon occurrence of the torque variation can be used to control the air-fuel ratio of the engine (upon occurrence of the torque variation, the air-fuel ratio is made rich), thereby suppressing the torque variation to a minimum. It will be easily understood by those skilled in the art to which this invention pertains that the air-fuel ratio of an engine having an electronic control type fuel injection system, and an engine having a carburetor can also be controlled, by an electronic circuit which is arranged to make the air-fuel ratio rich upon occurrence of the torque variation. Furthermore, upon occurrence of the torque variation, it is not always necessary to control the air-fuel ratio, but a checking device can be used which indicates whether the torque variation occurs or not.

We claim:

1. A torque variation detecting method for an internal combustion engine comprising the steps of:
   detecting operating conditions of said engine;
   generating, a plurality of times within a predetermined constant period, a signal related to the actual torque variations caused by variations of the combustion in said internal combustion engine;
   comparing the one of a plurality of average values of torque variation related to said detected operating conditions with said signal within said predetermined constant period, each of said average values being determined in advance and stored for a particular set of operating conditions of said internal combustion engine, respectively;
   establishing the number of times said comparing step indicates the detected torque variation is larger than the average value multiplied by a predetermined constant; and
   deciding that a reportable torque variation is present when said number of times is larger than a predetermined reference value and that a reportable torque variation is absent when said number of times is smaller than said predetermined value.

2. A method according to claim 1, wherein said actual torque varations detecting step includes the steps of detecting the mechanical vibrational acceleration of said engine and producing an output signal proportional to the vibrational acceleration.

3. A method according to claim 2, wherein said producing step includes the step of filtering said output signal to allow the passage of signals of 1 Hz to several Hz.

4. A torque variation detecting method for an internal combustion engine comprising the steps of:
   detecting operating conditions of said engine;
   detecting a plurality of times within a predetermined constant period, with torque variation detecting means, actual torque variations caused by a combustion variation of said engine;
   determining an average value of actual torque variations for at least one of a plurality of sets of said engine operating conditions from a predetermined number of actual torque variations detected during the occurance of said at least one of said sets of engine operating conditions;
   determining a deviation between said average value of actual torque variations corresponding to said at least one set of engine operating conditions and an average value of torque variations determined and stored in advance for said at least one set of operating conditions of said engine;
   correcting said stored average value of torque variations for said at least one set of engine operating conditions in accordance with said deviation;
   comparing the one stored average value corresponding to said detected engine operating conditions with each of the actual torque variations detectd by said torque variation detecting means within said predetermined constant period;
   deciding that a reportable torque variation is present when the number of times said comparing step indicates the detected torque variation is larger than the stored average value multiplied by a predetermined constant, is larger than a predetermined reference value, and that no reportable torque variation is present when said number of times is smaller than said predetermined reference value.

5. A method according to claim 4, wherein said average value determining step includes the step of converting the peak values of the signals detected during the predetermined period to digital values and accumulating said digital values said predetermined number of times.

6. A method according to claim 4, wherein said average value determining steps of the actual torque variations includes the steps of integrating the signal produced by said torque variation detecting means over a predetermined period of time and converting the resultant value to a digital amount and accumulating said predetermined number of times the digital amount.

7. A torque variation detecting apparatus for an internal combustion engine comprising:
   detecting means for detecting the operating condition of said engine;
   torque variation detecting means for generating a plurality of times within a predetermined constant period a signal related to actual torque variations caused by a combustion variation of said internal combustion engine; and
   processing means for: (1) comparing said signal with one of a plurality of average values of torque variation, said one average value being related to said detected operating conditions with each detected torque variation within said predetermined constant period, each of said average values being predetermined and stored in advance for a particular set of operating conditions of said engine, respectively, (2) establishing the number of times the comparing function of said processing means indicates the detected torque variation is larger than the average value multiplied by a predetermined constant, and (3) deciding that a reportable torque variation is present when said number of times is larger than a predetermined reference value and that no torque variation is present when said number of times is smaller than the predetermined reference value.

8. An apparatus according to claim 7 wherein said detectig means includes a crank shaft rotation detecting sensor and an intake manifold pressure detector.

9. An apparatus according to claim 8 wherein said detecting means includes a crank shaft rotation detecting sensor and an intake manifold pressure detector.

10. A torque variation detecting apparatus for an internal combustion engine comprising:

detecting means for detecting the operating conditions of said engine;

torque variation detecting means for detecting a plurality of times within a predetermined constant period actual torque variation caused by a combustion variation of said engine; and processing means for: (1) calculating an average value of actual torque variations for at least one of a plurality of sets of said operating conditions from a predetermined number of actual torque variations detected during the occurance of said at least one of said sets of engine operating conditions, (2) determining a deviation between said average value of actual torque variations corresponding to said at least one set of engine operating conditions and an average value of torque variations determined and stored in advance for said at least one set of engine operating conditions of said engine, and (3) correcting said stored average value of torque variations for said at least one set of engine operating conditions in accordance with said deviation, and (4) comparing the one stored average value corresponding to said detected engine operating condition with each of the actual torque variations detected by said torque variation detecting means within said predetermined constant period, and (5) deciding that a reportable torque variation is present when the number of times said comparing step indicates the detected torque variation is larger than the stored average value multiplied by a predetermined reference value, and that no torque is present when said number of times is smaller than said predetermined reference value.

* * * * *